United States Patent Office 3,565,976
Patented Feb. 23, 1971

3,565,976
O - [4 - (ALPHA - CYANO - BENZYLMERCAPTO) PHENYL](THIO)PHOSPHORIC, (THIO)PHOSPHONIC ACID ESTERS
Gerhard Schrader, Wuppertal - Cronenberg, Wolfgang Behrenz, Cologne-Stammheim, and Ingeborg Hammann, Cologne, Germany, assignors to Farbenfabriken Bayer Aktiengesellschaft, Leverkusen, Germany, a corporation of Germany
No Drawing. Filed Sept. 16, 1968, Ser. No. 760,060
Claims priority, application Germany, Sept. 25, 1967, P 16 68 024.3
Int. Cl. A01n 9/36; C07f 9/12, 9/18
U.S. Cl. 260—940                                                8 Claims

ABSTRACT OF THE DISCLOSURE (Alkyl and O-alkyl)-O-alkyl-O-[4-([phenyl-cyano]-methyl)-mercapto-phenyl]- -phosphoric, -phosphonic, thionophosphoric and thionophosphonic acid esters, i.e. (alkyl and O-alkyl)-O-alkyl-O-[4-($\alpha$-cyano-benzylmercapto)-phenyl]-phosphoric, -phosphonic, thionophosphoric and thionophosphonic acid esters, which possess pesticidal, especially acaricidal and insecticidal, properties and which may be produced by reacting the corresponding phosphoric (phosphonic) and thionophosphoric (-phosphonic) acid ester halide with $\alpha$-(4-hydroxyphenylmercapto)-benzylcyanide.

---

The present invention relates to and has for its objects the provision for particular new phosphoric (phosphonic) and thiono-phosphoric (-phosphonic) acid esters of $\alpha$-(4-hydroxyphenylmercapto)-benzylcyanide, i.e. (alkyl and O - alkyl) - O - alkyl - O - [4 - ($\alpha$-cyano-benzylmercapto)-phenyl]- -phosphoric, -phosphonic, -thionophosphoric and -thionophosphonic acid esters, which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

In German Pat. 1,192,202, insecticidally effective phosphoric, thionophosphoric, phosphonic, thionophosphonic, phosphinic or thionophosphinic acid 4-cyano-methylmercapto-phenyl esters are described which are obtainable by reaction of the corresponding acid halides with 4-cyano-methylmercapto-phenols.

It has been found in accordance with the present invention that the particular new phosphoric, phosphonic, thionophosphoric and thionophosphonic acid esters, i.e. phosphorus acid esters, of the formula

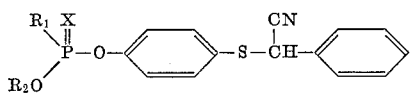
(I)

in which
R₁ is selected from the group consisting of lower alkyl and lower alkoxy,
R₂ is lower alkyl, and
X is selected from the group consisting of oxygen and sulfur, exhibit strong pesticidal, especially insecticidal and acaricidal, properties.

The present invention furthermore provides a process for the production of compounds of Formula I above in which a phosphoric, phosphonic, thionophosphoric or thionophosphonic acid ester halide of the general formula

(IIa)

in which
R₁, R₂ and X are the same as defined above, and
Hal is a halogen atom such as chloro, bromo, iodo and fluoro, especially chloro and bromo, is reacted with $\alpha$-(4-hydroxy-phenylmercapto)-benzylcyanide of the formula

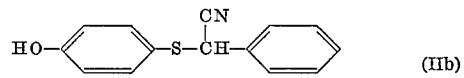
(IIb)

in the form of a salt or in the presence of an acid-binding agent.

Advantageously, it has been found that the new compounds of the present invention are distinguished by outstanding insecticidal and acaricidal, especially larvicidal, activities. The instant compounds are in this respect clearly superior to known compounds of analogous constitution which have been suggested for these purposes and possess a lower toxicity toward warm-blooded creatures as well as a concomitantly lower phytotoxicity. The instant compounds therefore represent a genuine enrichment of the art.

The course of the reaction for producing the compounds of the invention can be illustrated by the following reaction scheme:

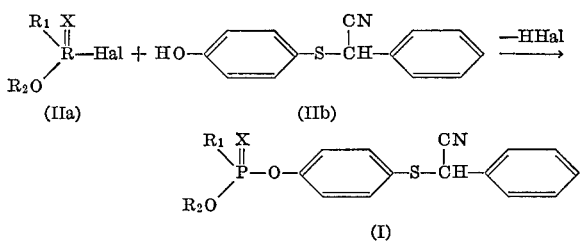

Advantageously, in accordance with the present invention, in the various formulae herein:

R₁ represents:

straight and branched chain lower alkyl such as methyl to tert.-butyl inclusive, especially methyl, ethyl, n- and iso-propyl, n-, iso- and s-butyl, and the like, and more particularly alkyl having 1-4, especially 1-2, carbon atoms, preferably ethyl; or straight and branched chain lower alkoxy such as methoxy to tert.-butoxy inclusive, especially methoxy, ethoxy, n- and iso-propoxy, n-, iso- and s-butoxy, and the like, and more particularly alkoxy having 1-4, especially 1-2, carbon atoms;

$R_2$ represents:

straight and branched chain lower alkyl as defined above for $R_1$, and more particularly having 1-4, especially 1-2, carbon atoms, $R_2$ and $R_1$ being the same or different where $R_1$ is also lower alkyl; and X represents:

oxygen or sulfur, and preferably oxygen when $R_1$ is lower alkoxy or sulfur when $R_1$ is either lower alkyl or lower alkoxy.

The instant compounds particularly contemplate the corresponding phosphoric, thionophosphoric and thionophosphonic acid esters of α-(4-hydroxy-phenylmercapto)-benzylcyanide.

The α-(4-hydroxy-phenylmercapto)-benzylcyanide required as starting material for the production process of the present invention can be produced, even on an industrial scale, by known methods involving reaction of α-bromo-benzylcyanide with thiohydroquinone in the presence of suitable acid acceptors, e.g. alkali metal alcoholates, in the usual solvents, e.g. acetonitrile.

The production reaction of the invention is preferably carried out in the presence of a solvent (this term includes a mere diluent). Particularly good results have been obtained with low-boiling aliphatic ketones and nitriles, such as acetone, methylethyl ketone, methylisopropyl ketone, methylisobutyl ketone, acetonitrile and propionitrile, and also (optionally chlorinated) aromatic or aliphatic hydrocarbons, for example benzene, toluene, xylene, chlorobenzene, methylene chloride, chloroform, carbon tetrachloride, mono-, di- and trichloroethylene; and the like. The reaction can—insofar as the reactivity of the ester halide concerned permits—also take place in water as solvent.

As already mentioned above, the reaction may be carried out with the use of an acid-binding agent, i.e. acid acceptor. Particularly suitable as such acid acceptor are alkali metal carbonates and alcoholates, such as potassium or sodium carbonate, methylate or ethylate, and also tertiary bases, for example triethylamine, diethylaniline or pyridine. Instead of working in the presence of an acid-binding agent, it is also possible to react the appropriate salt of the α-(4-hydroxyphenylmercapto)-benzylcyanide in accordance with the present invention. Especially suitable for this purpose are alkali metal salts and alkaline earth metal salts.

The reaction may be carried out within a fairly wide temperature range. In general, it is carried out at room temperature or slightly to moderately elevated temperature, and preferably at substantially between about 20–70° C. Since, however, the reaction is sometimes more or less strongly exothermic, it may in these cases be necessary, particularly at the beginning of the reaction, to cool the mixture externally. It has proved expedient to continue stirring of the reaction mixture (after combining the starting components) for a longer period (½ to 3 hours or overnight—optionally with slight heating) in order to complete the reaction.

As can be seen from reaction equation noted above, equimolar amounts of the starting materials are appropriate to the reaction. It has proved expedient to provide a solution or suspension of the phenolate (or of a mixture of the appropriate phenol and a suitable acid-binding agent) in one of the above-mentioned solvents and to add the acid ester halide dropwise thereto at the afore-said temperatures, with stirring. Working up of the mixture may take place in the usual manner by pouring the mixture out into the water, taking up the reaction product (which has separated in oily form) in one of the above-mentioned hydrocarbons, preferably benzene, washing and drying the organic phase, evaporating the solvent and, optionally, subsequently fractionally distilling the residue.

The new compounds of the present invention are in most cases colorless to slightly yellow-colored, water-insoluble oils which, even under greatly reduced pressure, cannot be distilled without decomposition; they can, however, be freed from the last volatile components by so-called "slight distillation," that is, by heating to slightly to moderately elevated temperatures in a vacuum, and in this way be purified.

As already indicated above, the acid esters of the present invention possess an outstanding, rapidly-commencing and long-lasting insecticidal and acaricidal effectiveness, with in some cases extremely low toxicity to warm-blooded animals and concomitantly low phytotoxicity. The instant compounds are therefore used with success in plant protection and the protection of stored products, as well as in the hygiene field, for the control of noxious sucking and biting insects, Diptera, mites, and the like.

To the sucking insects contemplated herein there belong, in the main, aphide, such as the green peach aphid (*Myzus persicae*), the beam aphid (*Doralis fabae*); scales, such as *Aspidiotus hederae*, *Lecanium hesperidum*, *Pseudococcus maritimus*; Thysanoptera, such as *Hercinothrips femoralis*; and bugs, such as the beet bug (*Piesma quadrata*) and the bed bug (*Cimex lectularius*); and the like.

With the biting insects contemplated herein, there are classed, in the main, butterfly caterpillars, such as *Plutella maculipennis*, *Lymantria dispar*; beetles, such as granary weevils (*Sitophilus granarius=Calandra granaria*), the Colorado beetle (*Leptinotarsa decemlineata*), and also species living in the soil, such as the wireworms (*Agriotes sp.*) and larvae of the cockchafer (*Melolontha melolontha*); cockroaches, such as the German cockroach (*Blatella germanica*); Orthoptera, such as the house cricket (*Gryllus domesticus*); termites, such as Reticulitermes; and Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*) and gnats, for example mosquitoes such as the yellow fever mosquito (*Aedes aegypti*), the northern house mosquito (*Culex pipiens*) and the malaria mosquito (*Anopheles stephensi*), and blowflies, such as *Lucilia sericata* and *Chrysomya chloropyga*; and the like.

In the case of the mites contemplated herein, particularly important are the spider mites (Tetranychidae) such as the two-spotted spider mite (*Tetranychus urticae* or *telarius* or *althaeae*), the European red mite (*Paratetranychus pilosus=Panonychus ulmi*); blister mites, such as the current blister mite (*Eriophyes ribis*) and tarsonemids, such as the cyclamen mite (*Tarsonemus pallidus*) and the broad mite (*Hemitarsonemus latus*), and ticks, such as the relapsing fever tick (*Ornithodorus moubata*) and *Boophilus microplus*; and the like.

Also to be classed with the biting insects contemplated herein are other beetles (Coleoptera), for example the dock beetle (*Gastrophysi viridula*), the mustard bettle (*Phaedon cochleariae*), the blossom bettle (*Meligethes aeneus*), the raspberry bettle (*Byturus tomentosus*), the bean weevil (Bruchidius=*Acanthoscelides obtectus*), the leather beattle (*Dermestes frischi*), the khapra beetle (*Trogoderma granarium*), the flour beetle (*Tribolium castaneum*), the northern corn billbug (Calandra or *Stiphilus zeamais*), the drugstore beetle (*Stagobium paniceum*), the yellow mealworm (*Tenebrio molitor*) and the saw-toothed grain beetle (*Oryzaephilus suri-*

*namensis*); other cockroaches, such as the American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; other termites such as the eastern subterranean termite (*Reticulitermes flavipes*) and the Hymenoptera such as the garden ant (*Lasius niger*); and the like.

The Diptera contemplated herein also comprise other flies, such as the little house fly (*Fannia canicularis*), the black blow fly (*Phormia aegina*) and bluebottle fly (*Calliphora erythrocephala*) as well as the stable fly (*Stomoxys calcitrans*); and the like.

When used in hygiene, the new compounds of the present invention are also distinguished by an outstanding activity against mosquito larvae.

The active compounds according to the instant invention can be utilized, if desired, in the form of the usual formulations or compositions with conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl eter, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage prepartions for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of the active compound or even the 100% active substance alone, e.g. about 40–100% by weight of the active compound.

In particular, the present invention contemplates methods of selectively controlling or combating pests, e.g. arthropods, i.e. insects and acarids, and more particularly, methods of combating at least one of insects and acarids, including larvae, which comprises applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

Mosquito larvae test:
Test creatures: *Aedes aegypti* (5th larval stage)
Solvent: 99 parts by weight acetone
Emulsifier: 1 part by weight benzylhydroxydiphenylpolyglycol ether.

To produce a suitable preparation of the particular active compound, 2 parts by weight of such active compound are dissolved in 1000 parts by volume of the above solvent containing the stated amount of emulsifier. The solution thus obtained is diluted with water to the desired final lower concentration.

The aqueous preparations of the given active compounds are placed in glass vessels and about 25 mosquito larvae are then placed in each glass vessel.

After 24 hours, the degree of destruction is determined as a percentage. 100% means that all the larvae are killed; 0% means that no larvae at all are killed.

The particular active compounds tested, their concentrations and the results obtained can be seen from the following Table 1.

TABLE 1.—MOSQUITO LARVAE TEST

| Active compound (constitution) | Concentration of active compound in the solution, p.p.m. | Degree of destruction, percent |
|---|---|---|
| (1₁) C₆H₅−CH(CN)−S−C₆H₄−O−P(=S)(OCH₃)₂ | 0.001 / 0.0001 | 100 / 70 |
| (2₁) C₆H₅−CH(CN)−S−C₆H₄−O−P(=S)(OC₂H₅)(C₂H₅) | 0.001 / 0.0001 | 100 / 90 |
| (A) CN−CH₂−S−C₆H₄−O−P(=S)(OCH₃)₂ (known) | 0.01 / 0.001 | 100 / 80 |
| (B) CN−CH₂−S−C₆H₄−O−P(=S)(OC₂H₅)(C₂H₅) (known) | 0.1 / 0.01 | 100 / 90 |

EXAMPLE 2

Phaedon larvae test:
  Solvent: 3 parts by weight acetone
  Emulsifier: 1 part by weight alkylaryl polyglycol ether.

To produce a suitable preparation of the particular active compound, 1 part by weight of such active substance is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the period of time stated in the following table, the degree of destruction of the pests is determined and expressed as a percentage: 100% means that all, and 0% means that none, of the beetle larvae are killed.

The particular active compounds tested, their concentrations, the evaluation time and the experimental results obtained can be seen from the following Table 2.

EXAMPLE 3

Bombyx test:
  Solvent: 3 parts by weight acetone
  Emulsifier: 1 part by weight alkylaryl polyglycol ether.

To produce a suitable preparation of the particular active compound, 1 part by weight of such active compound is mixed with the stated amount of solvent which contains the stated amount of emulsifier, and the resulting concentrate is diluted with water to the desired final concentration.

Mulberry leaves (*Morus nigra*) are sprayed until dew-moist with the preparation of the given active compound and then infested with caterpillars of the silkworm moth (*Bombyx mori*).

After the specified period of time, the degree of destruction is determined as a percentage. 100% means that all the caterpillars were killed, whereas 0% means that no caterpillars were killed.

The particular active compounds tested, their concen-

TABLE 2.—PHAEDON LARVAE TEST

| Active compound (constitution) | Concentration of active compound, percent | Degree of destruction in percent after 3 days |
|---|---|---|
| (3₁) (CH₃O)₂P(=O)−O−C₆H₄−S−CH(CN)−C₆H₅ | 0.1 / 0.01 | 100 / 70 |
| (4₁) (C₂H₅O)₂P(=O)−O−C₆H₄−S−CH(CN)−C₆H₅ | 0.1 / 0.01 | 100 / 100 |
| (1₂) (CH₃O)₂P(=S)−O−C₆H₄−S−CH(CN)−C₆H₅ | 0.1 / 0.01 | 100 / 40 |
| (2₂) (C₂H₅O)(C₂H₅)P(=S)−O−C₆H₄−S−CH(CN)−C₆H₅ | 0.1 / 0.01 | 100 / 20 | trations, the evaluation time and the results obtained can be seen from the following Table 3.

at 25 to 40° C., 48 g. O,O-dimethyl-thionophosphoric acid ester chloride, and the mixture is then stirred for

TABLE 3.—BOMBYX TEST

| Active compound (constitution) | Concentration of active compound, percent | Degree of destruction in percent after 3 days |
|---|---|---|
| (3₂) $(CH_3O)_2\overset{O}{\overset{\|}{P}}-O-\langle\bigcirc\rangle-S-\overset{CN}{\underset{\|}{C}H}-\langle\bigcirc\rangle$ | 0.1 / 0.01 | 100 / 95 |
| (4₂) $(C_2H_5O)_2\overset{O}{\overset{\|}{P}}-O-\langle\bigcirc\rangle-S-\overset{CN}{\underset{\|}{C}H}-\langle\bigcirc\rangle$ | 0.1 / 0.01 | 100 / 100 |

EXAMPLE 4

Rhopalosiphum test (systemic action):
Solvent: 3 parts by weight acetone
Emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 4.

1 hour at 70° C. The reaction mixture is washed with water and taken up in benzene, the benzene layer is separated and dried. The residue, after evaporation of the solvent, is slightly distilled. The yield is 109 g. (99% of the theory) of O,O-dimethyl-O-[4-(α-cyanobenzylmercapto)-phenyl]-thionophosphoric acid ester.

*Analysis.*—Calculated for C₁₆H₁₆NO₃PS₂ (molecular weight 365) (percent): P, 8.5; S, 17.5; N, 3.85. Found (percent): P, 8.14; S, 17.1; N, 3.90.

EXAMPLE 6

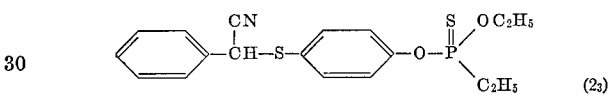

The preparation of the instant compound is effected in a manner similar to that of Example 5, but using ethylthionophosphonic acid O-ethyl ester chloride. The yield is 99% of the theory of ethyl-O-ethyl-O-[4-(α-cyano-benzylmercapto)-phenyl]-thionophosphonic acid ester.

*Analysis.*—Calcd. for C₁₈H₂₀NO₂PS₂ (molecular weight 377) (percent): P, 8.2; S, 16.9; N, 3.7. Found (percent): P, 7.6; S, 16.44; N, 3.8.

TABLE 4.—RHOPALOSIPHUM TEST (SYSTEMIC ACTION)

| Active compound (constitution) | Concentration of active compound in percent | Degree of destruction in percent after 4 days |
|---|---|---|
| (A) $(CH_3O)_2\overset{S}{\overset{\|}{P}}-O-\langle\bigcirc\rangle-S-CH_2-CN$ (known) | 0.1 | 90 |
| (B) $\overset{C_2H_5O}{\underset{C_2H_5}{\diagdown}}\overset{S}{\overset{\|}{P}}-O-\langle\bigcirc\rangle-S-CH_2-CN$ (known) | 0.1 | 60 |
| (3₃) $(CH_3O)_2\overset{O}{\overset{\|}{P}}-O-\langle\bigcirc\rangle-S-\overset{CN}{\underset{\|}{C}H}-\langle\bigcirc\rangle$ | 0.1 / 0.01 | 100 / 50 |
| (4₃) $(C_2H_5O)_2\overset{O}{\overset{\|}{P}}-O-\langle\bigcirc\rangle-S-\overset{CN}{\underset{\|}{C}H}-\langle\bigcirc\rangle$ | 0.1 / 0.01 | 100 / 50 |

The following further examples illustrate, without limitation, the process for producing the new compounds of the present invention.

EXAMPLE 5

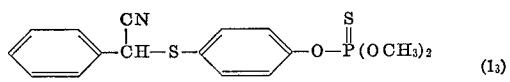

To a solution of 75 g. (0.3 mol) α-(4-hydroxy-phenylmercapto)-benzylcyanide in 300 ml. acetonitrile are added first 48 g. of dry potassium carbonate and then, The α-(4-hydroxy-phenylmercapto)-benzylcyanide to be used as starting material can be prepared for example as follows:

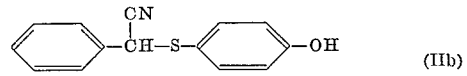

To 63 g. (0.5 mol) thiohydroquinone—dissolved in 500 ml. acetonitrile—there are added, at 20 to 40° C., 0.5 mol of a solution of sodium methylate in methanol. 100 g. α-bromobenzylcyanide are then added to the mixture at 20 to 30° C. After the reaction mixture has been stirred for three hours in benzene, it is washed until it has a neutral reaction. Finally, the solution is dried and evaporated. The yield is 95 g. (79% of the theory); the melting point of the product is 114° C.; it is obtained in the form of pale-yellow needles.

*Analysis.*—Calcd. for $C_{14}H_{11}NOS$ (molecular weight 241)(percent): S, 13.3; N, 5.8. Found (percent) S, 13.1; N, 5.9.

EXAMPLE 7

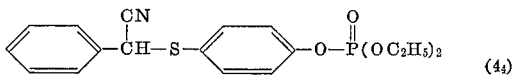

(4₄)

85 g. (0.35 mol) α-(4-hydroxy-phenylmercapto)-benzylcyanide are dissolved in 350 ml. acetonitrile. To this solution are added first 52 g. of dried and sieved potassium carbonate and then dropwise (with stirring), commencing at 20° C., 62 g. O,O-diethyl-phosphoric acid ester chloride. The temperature of the mixture rises to 50° C. After the exothermic reaction has subsided, the mixture is stirred for a further 10 hours at room temperature and then poured into 500 ml. ice water. The separated oil is taken up in 400 ml. benzene, the benzene solution is separated, dried over sodium sulfate and, finally, the solvent is distilled off under reduced pressure. There are obtained in this way 130 g. (98% of the theory) of the compound of the above constitution, i.e. O,O-diethyl-O-[4-(α-cyano-benzylmercapto)-phenyl]-phosphoric acid ester, in the form of a pale-yellow, water-insoluble oil.

*Analysis.*—Calcd. for $C_{18}H_{20}NO_4PS$ (molecular weight 377) (percent): S, 8.5; N, 3.7. Found (percent): S, 8.1; N, 3.6.

EXAMPLE 8

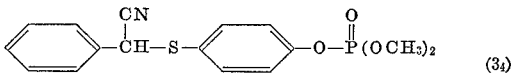

(3₄)

To a solution of 85 g. (0.35 mol) α-(4-hydroxy-phenylmercapto)-benzylcyanide in 350 ml. acetonitrile there are added first 52 g. of dry, sieved potassium carbonate and then, dropwise (with stirring), commencing at 20° C., 52 g. O,O-dimethyl-phosphoric acid ester chloride. The temperature of the reaction mixture rises to 55° C. After subsidence of the exothermic reaction, the mixture is stirred for a further 10 hours at room temperature and then worked up as described in Example 7. 100 g. (82% of the theory) of the compound of the above formula, i.e. O,O-dimethyl-O-[4-(α - cyano - benzylmercapto) - phenyl]-phosphoric acid ester, are obtained as pale-yellow, water-insoluble oil.

*Analysis.*—Calcd. for $C_{14}H_{16}NO_4PS$ (molecular weight 349) (percent): P, 8.9; S, 9.2; N, 4.0. Found (percent): P, 8.5; S, 9.1; N, 4.2.

It will be realized that all of the foregoing compounds contemplated by the present invention possess the desired selective pesticidal, especially anthropodicidal, i.e. insecticidal or acaricidal, including larvicidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective, i.e. toxic, amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphorus acid ester of the formula

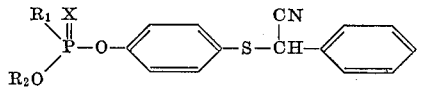

in which $R_1$ is selected from the group consisting of lower alkyl and lower alkoxy, $R_2$ is lower alkyl, and X is selected from the group consisting of oxygen and sulfur.

2. Ester according to claim 1 wherein $R_1$ is selected from the group consisting of $C_{1-4}$ alkyl and $C_{1-4}$ alkoxy, $R_2$ is $C_{1-4}$ alkyl, and X is selected from the group consisting of oxygen and sulfur.

3. Ester according to claim 1 wherein $R_1$ is lower alkoxy, $R_2$ is lower alkyl, and X is selected from the group consisting of oxygen and sulfur.

4. Ester according to claim 1 wherein $R_1$ is $C_{1-4}$ alkyl, $R_2$ is $C_{1-4}$ alkyl, and X is sulfur.

5. Ester according to claim 1 wherein such compound is O,O-dimethyl-O-[4 - (α - cyano - benzylmercapto)-phenyl-thionophosphoric acid ester of the formula

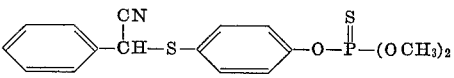

6. Ester according to claim 1 wherein such compound is ethyl-O-ethyl-O-[4-(α-cyano-benzylmercapto)-phenyl]-thionophosphonic acid ester of

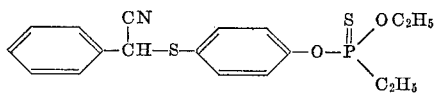

7. Ester according to claim 1 wherein such compound is O,O - dimethyl - O - [4-(α-cyano - benzylmercapto)-phenyl]-phosphoric acid ester of the formula

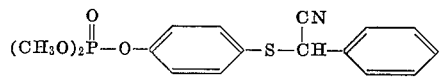

8. Ester according to claim 1 wherein such compound is O,O - diethyl - O - [4 - (α - cyano-benzylmercapto)-phenyl]-phosphoric acid ester of the formula

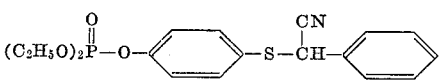

References Cited

UNITED STATES PATENTS 3,299,188   1/1967   Schicke _____ 260—940

JOSEPH P. BRUST, Primary Examiner

A. H. SUTTO, Assistant Examiner

U.S. Cl. X.R.

260—973; 424—210